(12) United States Patent
Xu

(10) Patent No.: US 9,237,442 B2
(45) Date of Patent: Jan. 12, 2016

(54) METHOD AND SYSTEM FOR POSITIONING MOBILE STATION IN HANDOVER PROCEDURE

(75) Inventor: Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 13/103,333

(22) Filed: May 9, 2011

(65) Prior Publication Data

US 2011/0274276 A1    Nov. 10, 2011

(30) Foreign Application Priority Data

May 10, 2010  (CN) .......................... 2010 1 0179293

(51) Int. Cl.
*H04L 29/06* (2006.01)
*H04W 12/04* (2009.01)
*H04W 36/00* (2009.01)
*H04W 84/04* (2009.01)

(52) U.S. Cl.
CPC .............. *H04W 12/04* (2013.01); *H04W 36/00* (2013.01); *H04W 84/045* (2013.01)

(58) Field of Classification Search
CPC .................................................... H04W 12/04
USPC ............................ 726/21; 713/375; 380/249
See application file for complete search history.

(56) References Cited

U.S. PATENT DOCUMENTS

| | | | | |
|---|---|---|---|---|
| 7,734,052 B2* | 6/2010 | Braskich | ............... | H04L 9/0836 380/277 |
| 7,957,533 B2* | 6/2011 | Patel | ..................... | H04W 12/04 380/270 |
| 8,134,972 B2* | 3/2012 | Nakamura et al. | ............ | 370/331 |
| 8,208,635 B2* | 6/2012 | Karschnia | ............. | H04W 12/04 380/270 |
| 9,049,592 B2* | 6/2015 | Walker | .................. | H04L 9/0838 |
| 2002/0146127 A1* | 10/2002 | Wong | ...................... | H04L 9/321 380/270 |
| 2008/0063204 A1* | 3/2008 | Braskich | ............... | H04L 9/0836 380/270 |
| 2008/0069348 A1* | 3/2008 | Walker | .................. | H04L 9/0338 380/46 |

(Continued)

FOREIGN PATENT DOCUMENTS

CN          101489223 A      7/2009
WO      2009/122260 A2    10/2009

OTHER PUBLICATIONS

Khalili et al.; Toward secure key distribution in truly ad-hoc networks; Published in: Applications and the Internet Workshops, 2003. Proceedings. 2003 Symposium on; Date of Conference: Jan. 27-31, 2003; pp. 342-346; IEEE Xplore.*

(Continued)

*Primary Examiner* — Bradley Holder
(74) *Attorney, Agent, or Firm* — Jefferson IP Law, LLP

(57) ABSTRACT

A method for obtaining a secure key is provided. The method includes sending an Access Safety Management Entity Key ($K_{ASME}$) to a gateway after finishing authentication and security process by a Mobility Management Entity (MME) in a core network; and computing, by the gateway, a Next Hop (NH) according to the $K_{ASME}$. The method provides a method for ensuring a working of a secure key chain when a handover process is terminated at a Hybrid Evolved NodeB Gateway (HeNB GW). Thus, key information cannot be lost when the handover process is terminated at the HeNB GW, and an impact of the handover process on a core network is reduced, and the efficiency of a User Equipment (UE) handover is improved.

18 Claims, 14 Drawing Sheets

(56) References Cited

U.S. PATENT DOCUMENTS

| | | | |
|---|---|---|---|
| 2008/0089519 A1* | 4/2008 | Ekberg | H04W 12/04 380/270 |
| 2008/0153460 A1* | 6/2008 | Chan et al. | 455/412.1 |
| 2008/0207168 A1 | 8/2008 | Forsberg | |
| 2009/0089583 A1* | 4/2009 | Patel | H04W 12/04 713/171 |
| 2009/0109925 A1 | 4/2009 | Nakamura et al. | |
| 2009/0125713 A1* | 5/2009 | Karschnia | H04W 12/04 713/153 |
| 2009/0201848 A1* | 8/2009 | Kumazawa et al. | 370/328 |
| 2009/0271623 A1* | 10/2009 | Forsberg et al. | 713/168 |
| 2010/0056156 A1 | 3/2010 | Xu et al. | |
| 2010/0095123 A1 | 4/2010 | He | |
| 2010/0297979 A1* | 11/2010 | Watfa et al. | 455/404.1 |
| 2011/0116629 A1* | 5/2011 | Forsberg et al. | 380/44 |

OTHER PUBLICATIONS

Azimi-Sadjadi et al.; Robust key generation from signal envelopes in wireless networks; Published in: Proceeding CCS '07; Proceedings of the 14th ACM conference on Computer and communications security; 2007; pp. 401-410; ACM Digital Library.*

* cited by examiner

US 9,237,442 B2

METHOD AND SYSTEM FOR POSITIONING MOBILE STATION IN HANDOVER PROCEDURE

PRIORITY

This application claims the benefit under 35 U.S.C. §119(a) of a Chinese patent application filed on May 10, 2010 in the Chinese Intellectual Property Office and assigned Serial No. 201010179293.6, the entire disclosure of which is hereby incorporated by reference.

BACKGROUND OF THE INVENTION

1. Field of the Invention

The present invention relates to mobile communication technologies. More particularly, the present invention relates to a method for obtaining a secure key.

2. Background of the Invention

In conventional mobile communication systems, in order to provide better services to a user group, a Closed Subscriber Group (CSG) should be formed with multiple wireless resource management entities for a specific user group. The wireless resource entities may include network entities in the wireless access network for managing wireless resources and access of the User Equipment (UE) and the network entities may include base stations or cells in various mobile communication systems. For instance, all users of a corporation or a school belong to a specific user group, and for the user group, a CSG is formed with multiple wireless resource management entities for providing special access services. For a specific user group, it is a common that the CSG is formed with multiple wireless resource management entities. A description is given hereafter using a Long Term Evolution (LTE) system of a System Architecture Evolution (SAE) as an example.

FIG. 1 is a schematic diagram illustrating a structure of an LTE system according to the related art.

Referring to FIG. 1, in a wireless access network of the LTE system, wireless resource management entities include Evolved NodeBs (eNBs) 102 and Home Evolved NodeBs (HeNBs) 103, and may further include a HeNB Gateway (HeNB GW) 104, as required. The eNB may directly connect with the Mobility Management Entity (MME) 105 in a core network. When the wireless resource management entity includes a HeNB GW 104, the HeNB 103 should connect with the MME 105 through the HeNB GW 104. When the wireless resource management entity does not include the HeNB GW 104, the HeNB 103 may directly connect from the MME 105.

In order to provide more access services in conventional mobile communication systems, various types of HeNBs, such as open HeNBs, hybrid HeNBs, and CSG HeNBs are provided. The open HeNBs do not have a specific user group which accesses the open HeNBs, and thus, any UE can access to the open HeNBs. The CSG HeNBs are used by a specific user group, such as all users in the above noted corporation and school. The CSG HeNBs are accessed by the UEs of the specific user group, which are referred to as CSG UEs, wherein the specific user group is served by the CSG HeNBs. The hybrid HeNB forms itself and other HeNBs into a CSG user group in order to provide access to the CSG UEs served by itself in order to provide better access services to the CSG UEs. Additionally, the hybrid HeNBs also allow the access of other non-CSG UEs, which are UEs not belonging to the CSG.

According to the above description, the conventional mobile communication system includes a CSG formed with multiple wireless resource management entities for providing CSG wireless resource management entities, such as CSG HeNB. The conventional mobile communication system also includes hybrid wireless resource management entities, such as hybrid HeNBs, for providing more access services. At the same time, the eNB may also support the functions of the CSG, or may be used as a hybrid eNB while supporting the CSG functions.

FIG. 2 is a schematic diagram illustrating a handover process for a UE moving between HeNBs or eNBs according to the related art.

Referring to FIG. 2, the movement of the UE is implemented through an S1 handover process. As shown in FIG. 2, optional descriptions of the S1 handover process which are well known to those skilled in the art are omitted in the following descriptions. The S1 handover process mainly includes the fowling processes. In step 201, a Source-(H)eNB (S-(H)eNB) sends a handover required message to a HeNB GW. The HeNB GW sends the handover required message to the MME in step 202. Next, the MME sends a handover request message to the HeNB GW, and the HeNB GW sends the handover request message to a Target-(H)eNB (T-(H)eNB) in step 203. In step 204, the T-(H)eNB allocates resources, sends a handover request acknowledgement message to the HeNB GW, and the HeNB GW sends the handover request acknowledgement message to the MME.

In step 205, the MME sends a handover command message to the HeNB GW, and the HeNB GW sends the handover command message to the S-(H)eNB. The S-(H)eNB sends the handover command message to the UE in step 206. In step 207, the UE synchronizes itself to a target cell, and sends a handover acknowledgement message to the T-(H)eNB. Next, the T-(H)eNB sends a handover notification message to the HeNB GW, and the HeNB GW sends the handover notification message to the MME in step 208. Then, the MME sends an update bearer request message to a Service-Gateway (S-GW)/Packet Data Network Gateway (PDN GW) in step 209. For convenience of description, the signaling processes between the S-GW and the PDN GW are omitted. The S-GW mainly provides a function of a user plane and the PDN GW is responsible for the charging, legal monitoring, and other similar functions. According to information of the UE's contexts, if the PDN GW has requested for the UE location and/or user CSG information, the MME carries information elements of the UE location and user CSG information in the update bearer request message.

Next, in step 210, the S-GW/PDN GW sends the update bearer response message to the MME. The UE initiates the Tuning and Analysis Utility (TAU) process in step 211. In step 212, the MME sends a UE context release command message to the HeNB GW, and the HeNB GW sends the UE context release command message to the S-(H)eNB. In step 213, the S-(H)eNB sends a UE context release completion message to the HeNB GW, and the HeNB GW sends the UE context release completion message to the MME.

It should be noted that the S-(H)eNB and the T-(H)eNB in FIG. 2 may be a HeNB or an eNB because the above process also applies in the S1 handover when the UE moves between the eNBs. Thus, S-eNB denotes a Source-eNB, T-eNB denotes a Target-eNB, S-HeNB denotes the Source-HeNB, and T-HeNB denotes the Target-HeNB.

It can be seen that when there are many HeNBs or eNBs, if the above handover method is adopted and each time the UE switches between the HeNB and eNB through the S1 handover, there is a very heavy load on the core network, and the many HeNBs or eNBs reduce an efficiency of the handover made by the UE under the same HeNB GW. Under this circumstance, if the handover process of the UE terminates at the gateway, the load brought on the core network by the handover may be reduced greatly. However, the communication protocol in the conventional standard does not advance a detailed solution wherein the handover process ends at the gateway. On the other hand, a security mechanism in the conventional standard also cannot allow the handover which terminates at the gateway.

FIG. 3 is a schematic diagram illustrating a structure of encryption secure levels in an Evolved-Universal Mobile Telecommunication Systems (UMTS) Terrestrial Radio Access Network E-UTRAN according to the related art.

Referring to FIG. 3, K is a permanent key of a universal integrated circuit card on a Universal Subscriber Identity Module (USIM) and an Authentication Center (AuC). A Cipher Key (CK) and an Integrity Key (IK) are generated by the AuC and the USIM in a process of Authentication and Key Agreement (AKA). The CK and IK are processed differently in an Evolved Packet System (EPS) services and the legacy secure contexts.

An Access Safety Management Entity Key ($K_{ASME}$) is an intermediate key generated by the UE and MME after the AKA. The UE and MME further generate the key for the Non-Access Stratum (NAS) Layer Encryption ($K_{NASenc}$) and NAS Integrity Protection ($K_{NASint}$) according to the $K_{ASME}$. The Evolution Node Key ($K_{eNB}$) is a key obtained by the UE and the MME or by the UE and the eNB. A Next Hop (NH) is a key for the forward secure derived by the UE and the MME. A key $K_{UPenc}$ for encrypting an air interface access layer user plane, a key $K_{RRCenc}$ for controlling a plane encryption, and a key $K_{RRCint}$ for controlling a plane integrity protection are further derived according to the $K_{eNB}$.

FIG. 4 is a schematic diagram illustrating the principle for generating the key during the handover process according to the related art.

Referring to FIG. 4, the initial $K_{eNB}$ is calculated according to the $K_{ASME}$ and a NAS uplink COUNT. When the UE and eNB need to establish the initial Access Stratum (AS) secure contexts, the $K_{eNB}$ and the NH are derived by the MME and UE. The $K_{eNB}$ and NH are derived from the $K_{ASME}$. A NH Changing Counter (NCC) of the NH is associated with each $K_{eNB}$ and NH. Each $K_{eNB}$ is associated with the NCC corresponding to the NH, and from which the $K_{eNB}$ is derived. At the beginning, the $K_{eNB}$ is directly derived from the $K_{ASME}$. Thus, the $K_{eNB}$ is associated with a virtual NH, and the NCC, to which the NH corresponds, is 0. At the beginning of the establishment, the derived NH corresponds to the NCC 1. The initial NCC is 0 when the eNB receives the initial contexts establishment request.

In the process of a handover, the eNB key used between the UE and the target eNB is derived from the current eNB or NH. In order to distinguish the eNB key used between the UE and the source NB and the eNB key used between the UE and the target NB, the former is recorded as $K_{eNB}$, and the latter is recorded as the $K_{eNB}^*$. A method for deriving the key according to the current $K_{eNB}$ is called the horizontal key generation mechanism, and a method for deriving the key according to the NH is called the vertical key generation mechanism. When the $K_{eNB}^*$ is generated according to the $K_{eNB}$ or NH, the Physical Cell Identity (PCI) and frequency (EARFCN-DL) of the target cell should be bound.

It can be seen that only the UE and the MME can compute the current NH, and the gateway does not have the ability of computing the current NH. Thus, if the handover terminates at the gateway, the gateway cannot obtain the current NH. Accordingly, the conventional method of communication discussed above has many disadvantages in security. Thus, the conventional method does not solve the problem of ensuring the working of a secure key chain when the handover terminates at the gateway.

SUMMARY OF THE INVENTION

Aspects of the present invention are to address at least the above-mentioned problems and/or disadvantages and to provide at least the advantages described below. Accordingly, an aspect of the present invention is to provide a secure key obtaining method, which may ensure the working of the secure key chain when the handover process is terminated at the gateway.

In accordance with an aspect of the present invention, a method for obtaining a secure key is provided. The method includes sending an Access Safety Management Entity Key ($K_{ASME}$) to a gateway after finishing authentication and security process by a Mobility Management Entity (MME) in a core network; and computing, by the gateway, a Next Hop (NH) according to the $K_{ASME}$.

According to another aspect of the present invention, the method further includes receiving, by the gateway, a handover message which is a handover required message or a path switch request message from a Base Station (BS), obtaining, by the gateway, a new NH through the computing of the NH, and sending the new NH and a NH Change Counter (NCC) corresponding to the new NH to the BS.

According to another aspect of the present invention, the method further includes sending, by the MME, an updated $K_{ASME}$ and an Evolved NodeB Key ($K_{eNB}$) to the gateway; and saving, by the gateway, the updated $K_{ASME}$ and $K_{eNB}$, and sending the updated $K_{eNB}$ to a Home Evolved NodeB (HeNB).

According to another aspect of the present invention, the MME sends the $K_{ASME}$ and $K_{eNB}$ to the gateway through an initial context establishment request message or a User Equipment (UE) context modification request message.

According to another aspect of the present invention, when the UE handover occurs between a source BS and a target BS, the method further includes sending, by the gateway, a most current NH and a NCC to the MME in the core network; and computing, by the MME in the core network, a new NH according to the most current NH, and sending the new NH and the corresponding NCC to the target BS.

According to another aspect of the present invention, the gateway sends the most current NH and the corresponding NCC to the MME in the core network through a handover required message.

According to another aspect of the present invention, when the UE moves from a source gateway to one of a target gateway and a target BS, the method further includes sending, by the source gateway, the $K_{ASME}$, the most current NH and a NCC to the target gateway or the target BS; sending, by the target gateway or target BS, the most current NH and the NCC to the MME in the core network; and computing, by the MME in the core network, a new NH according to the most current NH.

According to another aspect of the present invention, the source gateway sends the $K_{ASME}$, the new NH and the NCC to the target gateway or target BS through a handover request message of an X2 interface.

According to another aspect of the present invention, the target network sends the new NH and the NCC to the MME in the core network through a path handover request message of an S1 interface.

In accordance with an aspect of the present invention, a method for obtaining a secure key is provided. The method includes sending, by a source Base Station (BS), a handover required message which comprises an Evolved NodeB Key ($K_{eNB}^*$) and NCC of the Next Hop (NH) computed by the source BS, to a gateway, sending, by the gateway, a handover request message which comprises $K_{eNB}^*$ and corresponding NCC to a target BS, and taking, by the target BS, the $K_{eNB}^*$ as a new key used between the target BS and the UE.

It can be seen from the above technical scheme that the secure key obtaining method provided by embodiments of the present invention gives a method for ensuring the working of secure key chain when the handover process terminated at the HeNB GW. Thus, the key information cannot be lost when the handover process terminated at the HeNB GW, the effect of the handover process on the core network is reduced, and the efficiency of the UE handover is improved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention is further described in detail hereinafter with reference to the accompanying drawings to make the objective and technical solution thereof more apparent.

In comparison to a conventional Home Evolved NodeB (HeNB) architecture as an example, an exemplary embodiment of the present invention describes a method for addressing a security problem when handover signaling terminates at a HeNB Gateway (HeNB GW) if a User Equipment (UE) moves from one HeNB to another. When an Evolved NodeB (eNB) accesses a Mobility Management Entity (MME) through the gateway (GW), or other wireless resource management entities access the core network through the GW, a method of exemplary embodiments of the present invention is also applicable.

In the present exemplary embodiment of the present invention, an S1 interface using an S1 Access Protocol (S1AP) protocol between the HeNB and the HeNB GW, and an X2 interface using an X2 Access Protocol (X2AP) protocol between the HeNBs are provided.

A first exemplary method of the present invention is described in the embodiments of FIGS. 5 to 10.

Figure 1:
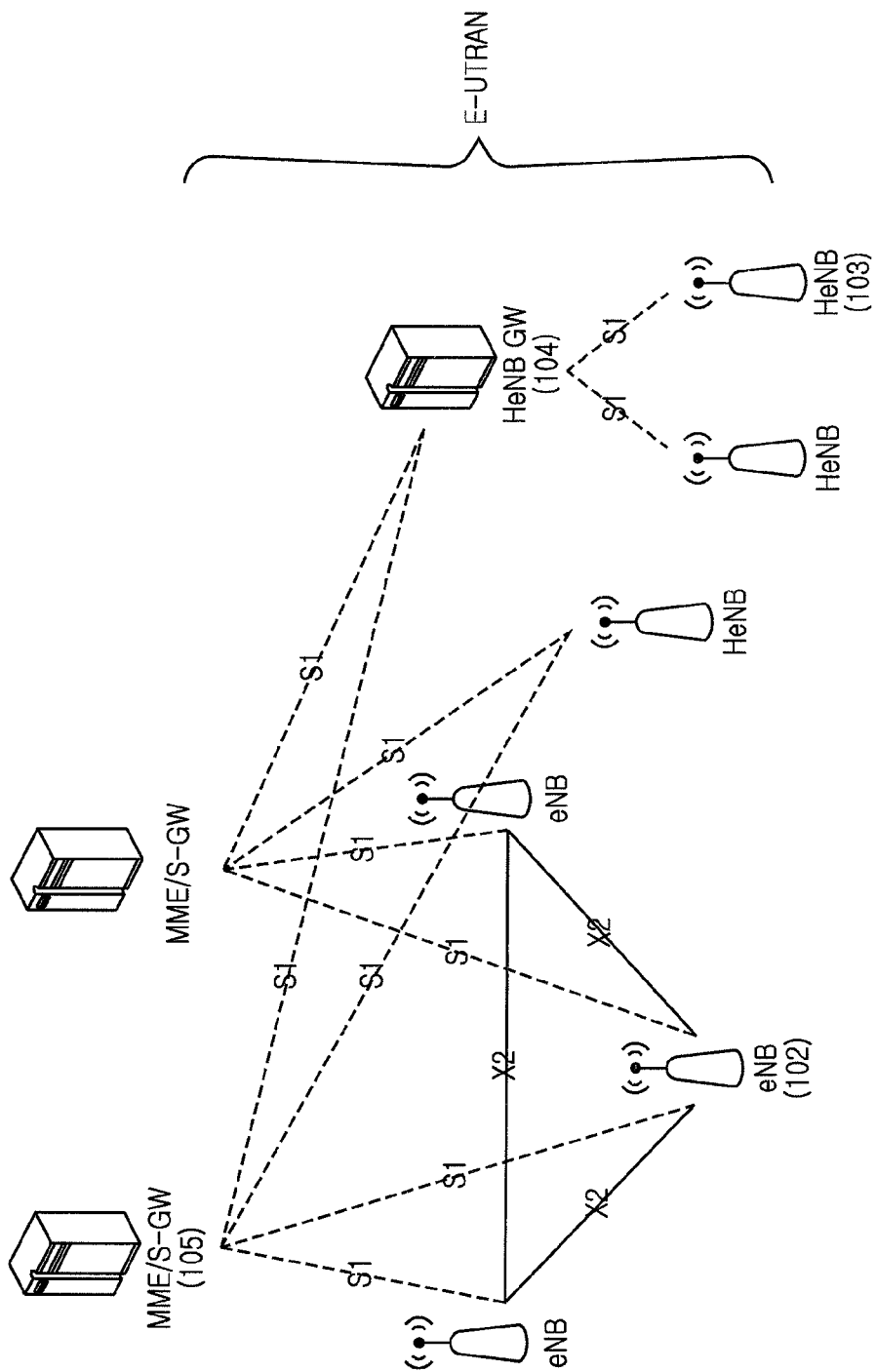
FIG. 1 is a schematic diagram illustrating a structure of a conventional LTE system according to the related art.
Figure 2:
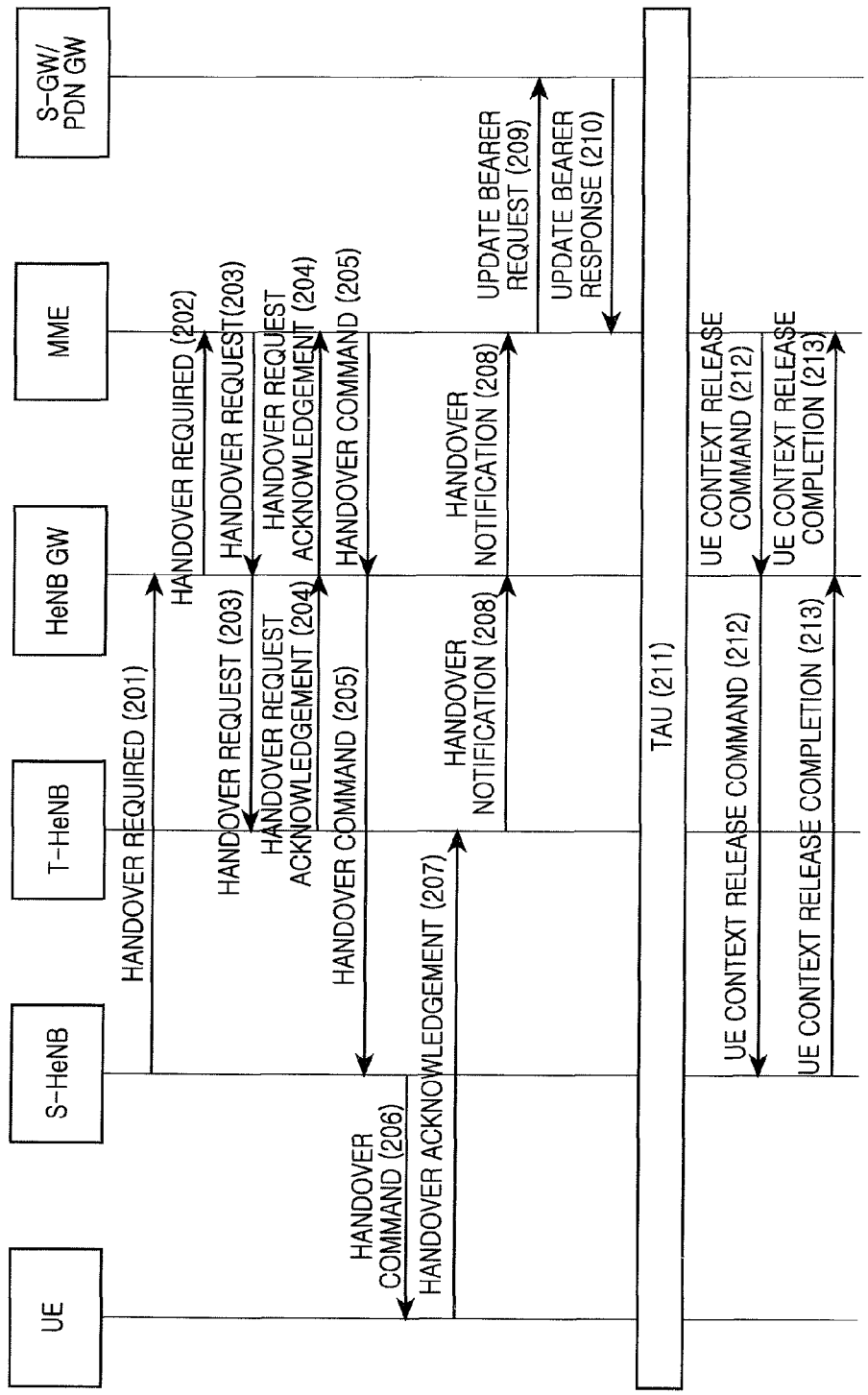
FIG. 2 is a schematic diagram illustrating a handover process that an UE moves between a HeNBs according to the related art.
Figure 3:
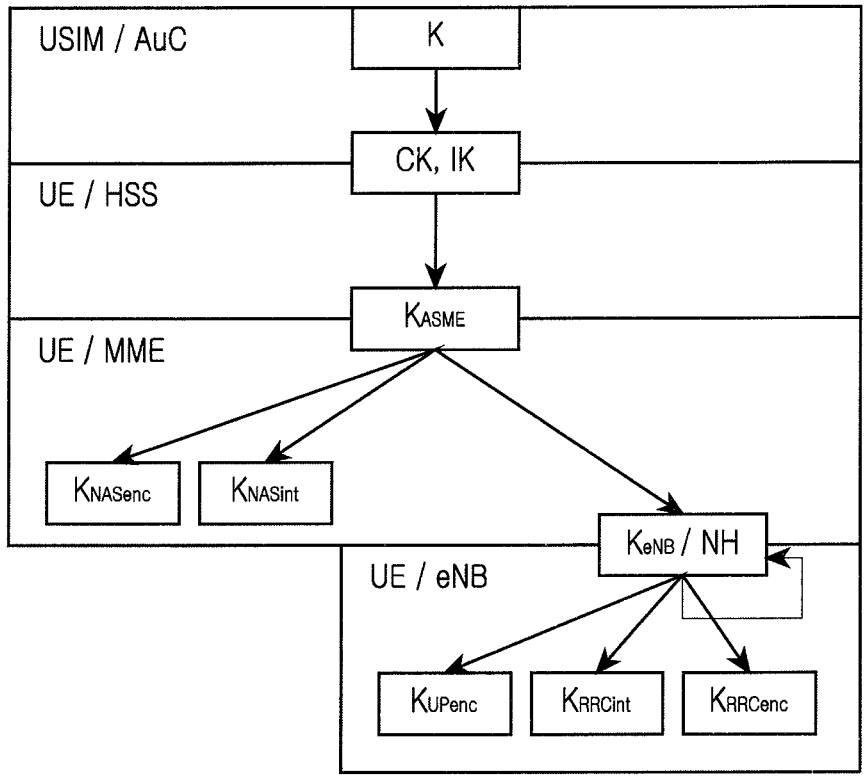
FIG. 3 is a schematic diagram illustrating structure of encryption security levels in a conventional E-UTRAN according to the related art.
Figure 4:
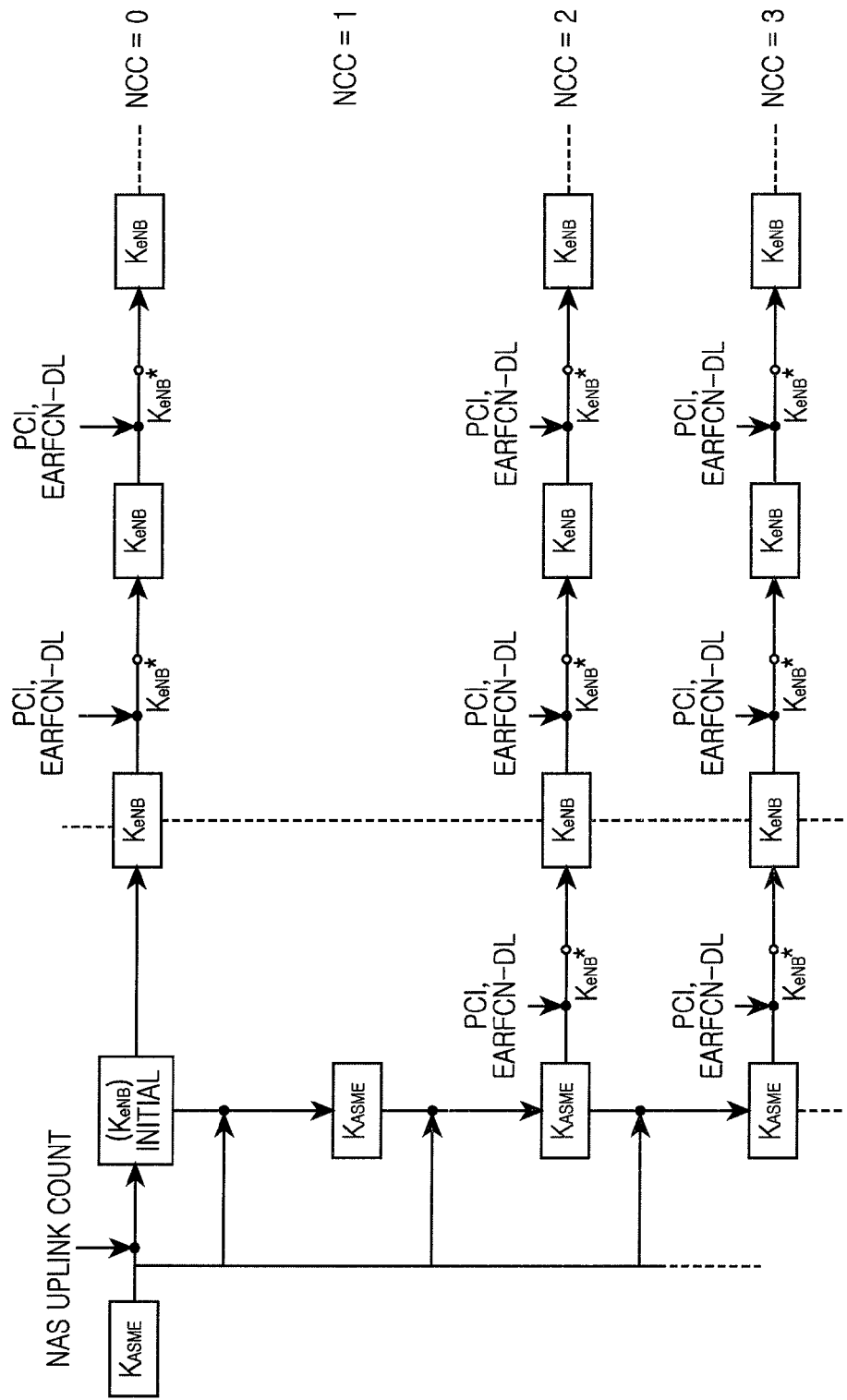
FIG. 4 is a schematic diagram illustrating a principle for generating a key during a handover process according to the related art.
Figure 5:
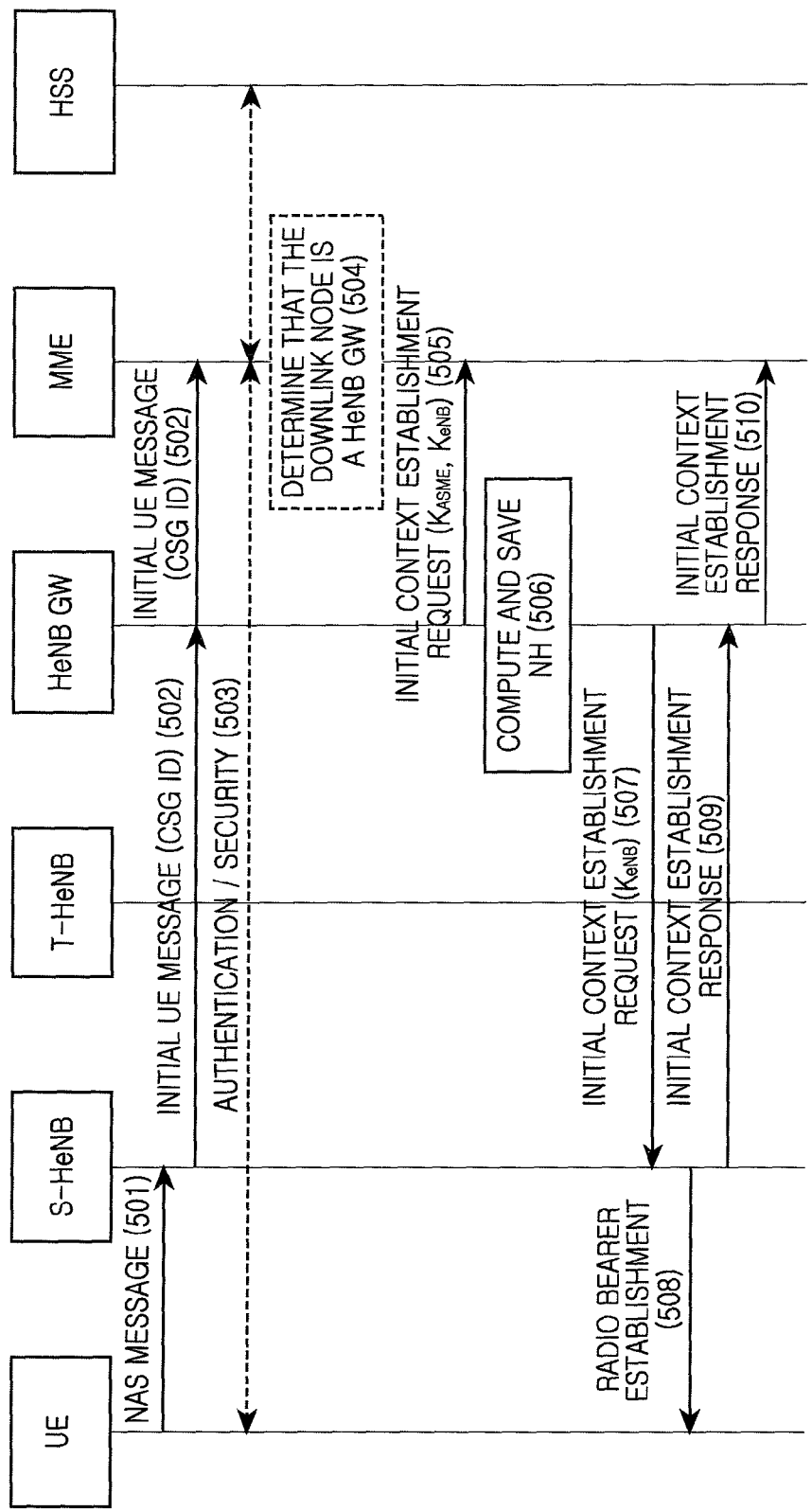
FIG. 5 is a flowchart illustrating an embodiment that the gateway has a function of deriving a key in accordance with an exemplary embodiment of the present invention.

FIG. 5 is a flowchart illustrating an embodiment in which the gateway has a function of deriving a key and obtains corresponding security information from an MME in accordance with an exemplary embodiment of the present invention.

Referring to FIG. 5, the present exemplary embodiment is described hereafter in detail. Some optional processes and processes unrelated to the present invention are omitted.

In step 501, a UE sends a Non-Access Stratum (NAS) message, for instance an Attach or a service request, to a HeNB. Next, the HeNB sends a NAS message to the HeNB GW via an S1 Access Protocol (S1AP) message initial UE message in step 502. If a cell to which the UE seeks access is a CSG cell or hybrid cell, then the message carries a CSG ID. Continuing with step 502, the HeNB GW sends the S1AP message initial UE message to the MME. If the cell to which the UE seeks access is the CSG cell or the hybrid cell, then the message carries the CSG ID.

Next, in step 503, which is an optional step, an authentication/security process is executed. The executed security process may be identical with that of a conventional method, such as TS23.401, and thus, a detailed technical description is omitted. In step 504, the MME determines that a downlink node is an HeNB GW. A method for the MME determining that the downlink node is the HeNB GW includes the following four methods.

Figure 14:
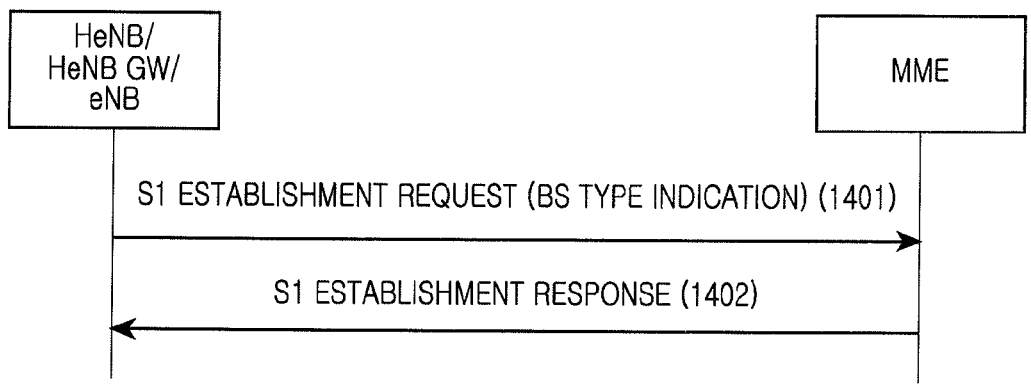
FIG. 14 is a flowchart illustrating a method that a BS notifies the core network of the type of itself in accordance with an exemplary embodiment of the present invention.

According to method one, the MME may distinguish the type of the entity according to a coding of the Identification (ID) of a downlink node entity, such as an ID of the eNB, an ID of the HeNB, or an ID of the HeNB GW. For instance, the ID of the eNB begins at 00, the ID of the HeNB begins at 01, and the ID of the HeNB GW begins at 10. According to method two, during an establishment of S1, an S1 establishment request message received by the MME from the downlink node carries a Tracking Area (TA) list supported by itself. The HeNB GW supports a specific TA list, and the MME knows that the downlink node is the HeNB GW according to the specific TA list. According to method three, during the establishment of S1, the S1 establishment message sent from the HeNB GW to the MME includes a BS type indication for indicating that the downlink node is the HeNB GW. A detailed description of method three is shown in FIG. 14. According to method four, the initial UE message sent from the HeNB GW in step 502 (see FIG. 5) to the MME carries a Base Station (BS) type indication for indicating that the downlink node is the HeNB GW. The indication is further used for indicating that the downlink node is the HeNB or the eNB. The method for the MME determining that the downlink node is the HeNB GW may be any one of the above four methods. However, the present invention is not limited thereto, and other suitable implementation methods that do not affect the main contents of the embodiments of the present invention may be used. Additionally, step 504 is an optional step.

Next, in step 505, the MME sends an initial context establishment request message to the HeNB GW. The message includes information elements $K_{ASME}$ and $K_{eNB}$. In step 506, the HeNB GW computes the NH according to a conventional method and saves the NH in the UE contexts and also saves the $K_{ASME}$ and $K_{eNB}$. Next, the HeNB GW sends an initial context establishment request message to the HeNB in step 507. The message includes an information element $K_{eNB}$. Next, in step 508, the HeNB establishes a radio bearer between the UE and itself. In step 509, the HeNB sends an initial context establishment response message to the HeNB GW. Next, the HeNB GW sends the initial context establishment response message to the MME in step 510.

Figure 6:
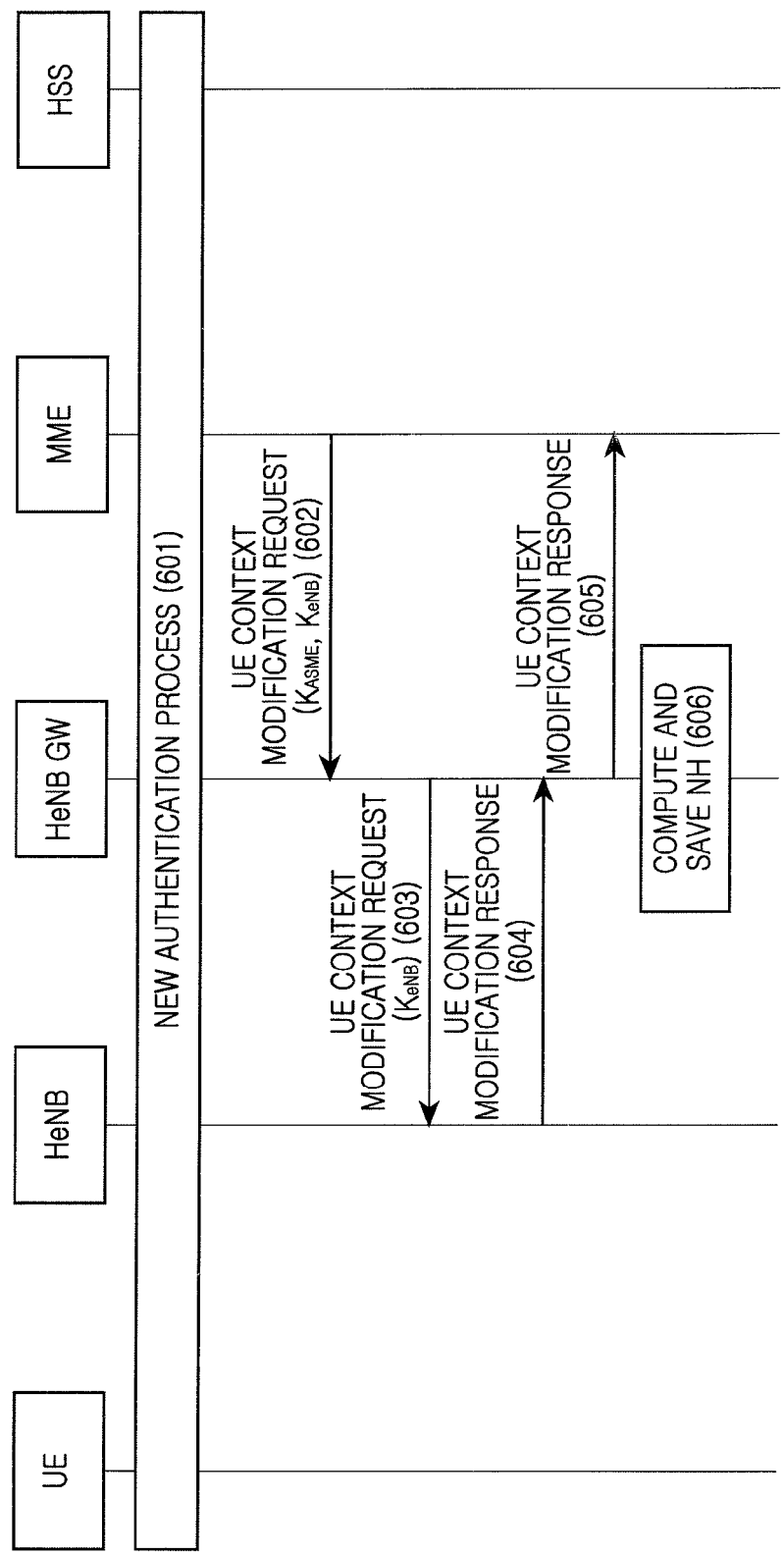
FIG. 6 is a flowchart illustrating an embodiment that the gateway has the function of deriving a key and obtains updated corresponding security information from the MME.

FIG. 6 is a flowchart illustrating an embodiment wherein the gateway has a function of deriving a key and obtaining updated security information from the MME in accordance with an exemplary embodiment of the present invention.

A detailed description of the embodiment is given hereafter, and optional processes and steps unrelated to the embodiment are omitted for ease of description.

Referring to FIG. 6, in step 601, a new authentication process is performed between a network and a UE. Next, in step 602, a MME sends a UE context modification request message to a HeNB GW. The UE context modification request message includes the $K_{ASME}$ and $K_{eNB}$, and the HeNB GW saves the updated $K_{ASME}$ and KeNB. In step 603, the HeNB GW sends the UE context modification request message, including the updated $K_{eNB}$, to the HeNB.

Next, the HeNB sends a UE context modification response message to the HeNB GW in step 604. In step 605, the HeNB GW sends the UE context modification response message to the MME. Next, the HeNB GW computes and saves the NH according to the new $K_{ASME}$ and $K_{eNB}$ in step 606. The update of the NCC is identical with that in a conventional method. Additionally, there is no fixed or absolute sequence between the steps 603 and 606.

Figure 7:
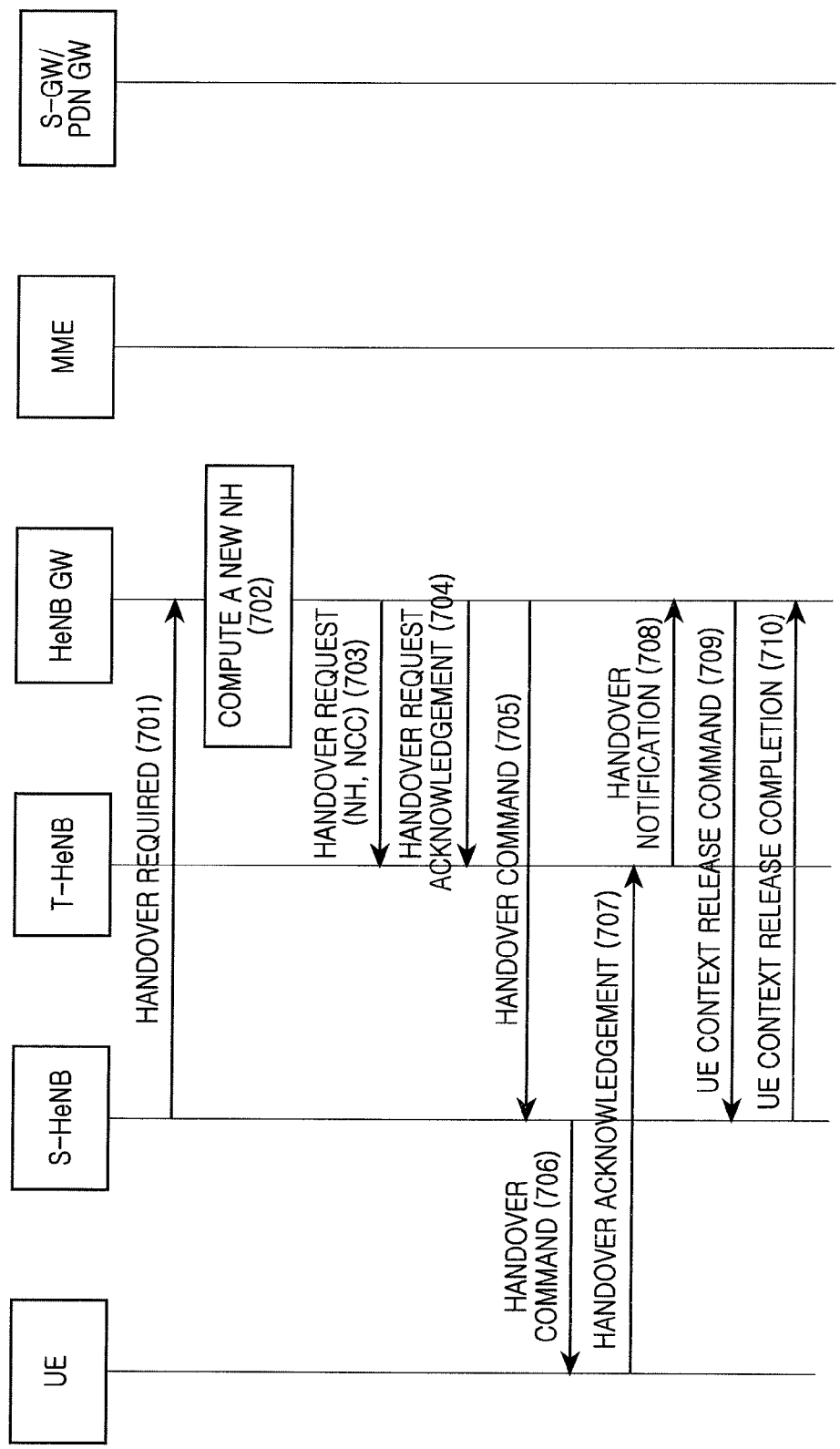
FIG. 7 is a flowchart illustrating a first embodiment that the gateway has the function of deriving a key and supports the handover process.

FIG. 7 is flowchart illustrating a first embodiment wherein the gateway has a function of deriving a key and supports a handover process in accordance with an exemplary embodiment of the present invention.

A detailed description is given hereafter and some optional processes and steps unrelated to the present invention are omitted for convenience of description.

If a target cell is a CSG cell, in a process in which a UE switches to the target cell, access control needs to be performed on the UE in order to determine whether the UE may access the target cell. If the UE cannot access the target cell, the handover process fails. If the target cell is a hybrid cell, then whether the UE is a member of the target cell should be determined. The target cell may provide different Quality of Services (QoS) according to whether the UE is a member of the target cell.

An entity executes the access control according to whether a Closed Subscriber Group (CSG) ID of the target cell is in a CSG list to which has UE access. The access control may be performed by a source HeNB, a HeNB GW or a target HeNB. Alternatively, if a source cell and the target cell are located at the same CSG, the access control may be omitted. Since the access control is not the focus of the present exemplary embodiment, a detailed description of the access control method is omitted for ease of description.

Referring to FIG. 7, in step 701, a source HeNB sends a handover required message to a HeNB GW. The handover required message includes indication information indicating whether the UE is a member of the target cell, or in other words, whether the UE is a subscribed member of the target cell. Due to the indication information being included in the handover required message, the HeNB GW notifies the target HeNB of the information indicating whether the UE is a member in step 702, as discussed below. The target HeNB may provide different QoSs according to information indicating whether the UE is a member of the target cell. However, the indication information is an optional information element and is not required in all embodiments of the present invention. For instance, the indication information may be not used in an embodiment wherein the handover process terminates at the HeNB GW in a scenario having the UE move in a same HeNB GW and with a same CSG ID, or in other words, a CSG with the same CSG ID, or a HeNB of a hybrid cell with the same CSG ID. In this scenario, the HeNB GW need not have the access control function, and the HeNB GW should only send a member ID received from a source end to a target end.

Next, in step 702, the HeNB GW determines that the handover process terminates at the HeNB GW. However, because the present exemplary embodiment does not focus on how to determine that the handover process ends at the HeNB GW, detailed descriptions thereof is omitted. Continuing with step 702, the HeNB GW adds a NCC value saved by the HeNB GW and computes a new NH according to the saved NCC value. The method for computing the NH is identical with that of a conventional method.

In step 703, the HeNB GW sends a handover request message to a T-HeNB. The message includes the newly computed NH and a current NCC value, which is the value obtained after adding 1 to a previous NCC. Next, in step 704, the T-HeNB computes a $K_{eNB}$ used between itself and the UE using the NH and the NCC as a pair and a Physical Cell Identity (PCI) and a frequency (EARFCN-D) of the target cell. A method of computing the KeNB is well known to one of ordinary skill in the art, and thus, detailed computation descriptions thereof are omitted. The target HeNB associates the received NCC and KeNB. The target HeNB carries the NCC of the NH-NCC pair in a handover command message sent to the UE, and deletes the old and invalid NH-NCC pair. Continuing with step 704, the target HeNB sends a handover request acknowledgement message to the HeNB GW.

In step 705, the HeNB GW sends a handover command message, which is also called a Radio Resource Control (RRC) connection reconfiguration message, to an S-HeNB. Next, in step 706, the source HeNB sends the handover command message to the UE. In step 707, the UE sends a handover acknowledgement is also call a RRC connection reconfiguration completion, message to the target HeNB. Next, in step 708, the target HeNB sends a handover notification message to the HeNB GW. In step 709, the HeNB GW sends a UE context release command message to the source HeNB, and in step 710, the source HeNB sends a UE context release completion message to the HeNB GW.

Figure 8:
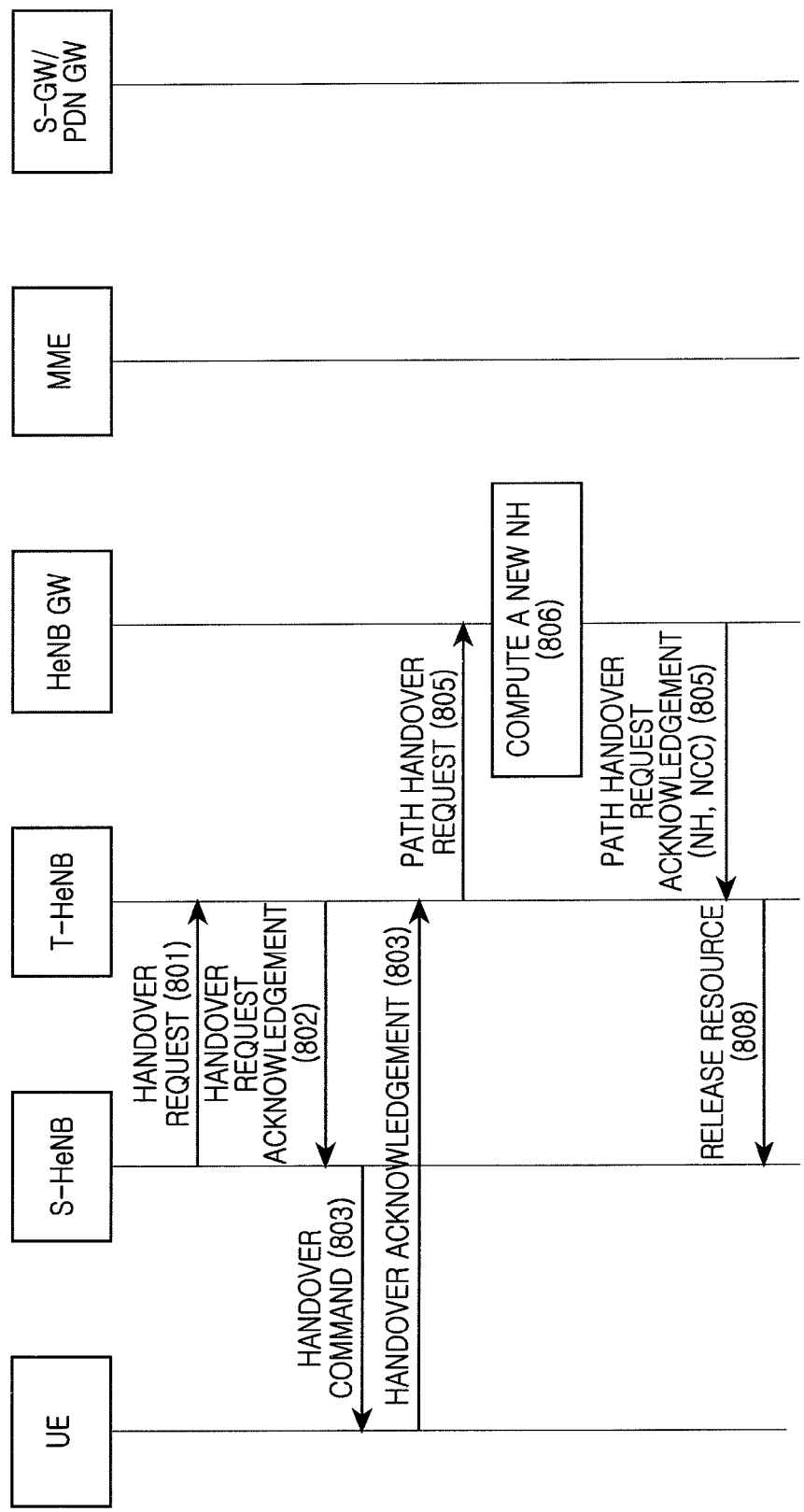
FIG. 8 is a flowchart illustrating a second embodiment that the gateway has a function of deriving a key and supports the handover process.

FIG. 8 is a second embodiment that the gateway has the function of deriving the key and supporting the handover process in accordance with an exemplary embodiment of the present invention.

A detailed description of the present exemplary embodiment is given hereafter. Some optional processes and steps unrelated to the present exemplary embodiment are omitted for convenience of description. Similar to the description of FIG. 7, access control may be performed by an S-HeNB, HeNB GW or a T-HeNB. Alternatively, if a source cell and a target cell are located at the same CSG, the access control may be omitted. With respect to FIG. 8, detailed descriptions of the access control method are omitted for convenience of description.

Referring to FIG. 8, in step 801, the S-HeNB sends a handover request message to the T-HeNB. Although not required in all embodiments of the present invention, the message includes a CSG ID of the target cell, as well as an ID list of the CSGs to which the UE may access. Next, in step 802, the T-HeNB allocates resources and sends a handover request acknowledgement message to the source HeNB. The S-HeNB sends a handover command message to the UE in step 803. In step 804, the UE sends a handover acknowledgement message to the T-HeNB. Next, in step 805 the T-HeNB sends a path handover request message to the HeNB GW.

In step 806, the HeNB GW increments a NCC value saved by itself, and computes a new NH using the $K_{ASME}$ and a saved NH. The method for computing the new NH is similar to the conventional method. Next, in step 807, the HeNB GW sends a path handover request acknowledgement message to the T-HeNB. The path handover request acknowledgement message includes the newly-computed NH and NCC. The T-HeNB saves the received NH-NCC pair for a next handover, and deletes previously saved NH-NCC pairs. In step 808, the target HeNB sends a resource release message to the source HeNB.

Figure 9:
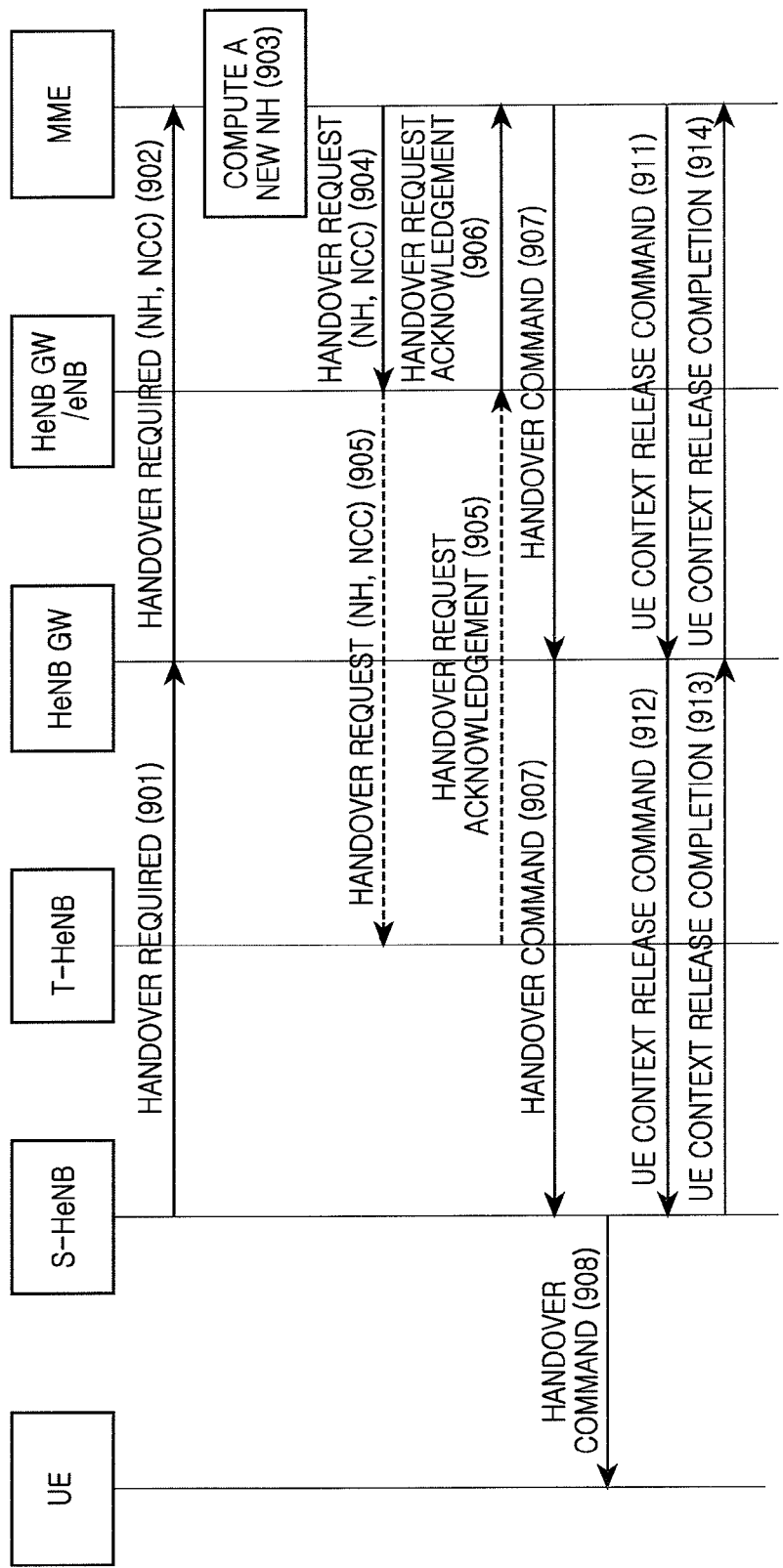
FIG. 9 is a flowchart illustrating a method for ensuring the working of a key chain when the UE moves from a HeNB GW to another HeNB GW or an eNB in accordance with a first exemplary embodiment of the present invention.

FIG. 9 is a flowchart illustrating a method for ensuring a working of a key chain when a UE moves from a HeNB GW to another HeNB GW or an eNB in accordance with an exemplary embodiment of the present invention.

Detailed descriptions of the present exemplary embodiment are given hereafter. Some optional processes and steps unrelated to the present invention are omitted for convenience of description. For example, detailed descriptions of an access control method are omitted.

Referring to FIG. 9, in step 901, an S-HeNB sends a handover required message to a HeNB GW. Next, in step 902, the HeNB GW sends a handover required message to a MME. The handover required message includes a current NH and a NCC. The HeNB GW delegates an operation for deriving the key to the MME. In step 903, the MME adds the received NCC value, and computes a new NH according to a $K_{ASME}$ and the received NH. An algorithm for computing the new NH and NCC may be similar to that of a conventional method. Next, in step 904 a MME sends a handover request message to a target HeNB GW/eNB, and the message carries the newly computed NH and NCC.

In step 905, if a UE moves to the HeNB of another HeNB GW, the target HeNB GW sends the handover request message to the T-HeNB. The handover request message includes the NH and NCC received from the MME. The target eNB/HeNB computes a $K_{eNB}$ used between itself and the UE using the NH-NCC pair and a PCI and an EARFCN-D of the target cell. A method of computing the $K_{eNB}$ is well known, thus a detailed description is omitted herein. The T-HeNB associates the received NCC and $K_{eNB}$. The T-HeNB carries the NCC of the NH-NCC pair in a handover command message sent to the UE, and deletes an old invalid NH-NCC pair. Continuing with step 905, the T-HeNB sends a handover request acknowledgement message to the HeNB GW.

In step 906, the T-HeNB GW/eNB sends the handover request acknowledgement message to the MME. Next, in step 907, the MME sends a handover command message to the source HeNB GW. The source HeNB GW sends the handover command message to the S-HeNB, and in step 908, the S-HeNB sends the handover command message to the UE. Next, in step 909, the UE sends a handover acknowledgement message to the target HeNB GW/eNB. If the UE moves to the HeNB of another HeNB GW, the UE sends a handover acknowledgement message to the T-HeNB. The T-HeNB sends the handover acknowledgement message to the target HeNB GW.

In step 910, the target HeNB GW/eNB sends a handover notification message to the MME. Next, in step 911, the MME sends a UE context release command message to the source HeNB GW, and in step 912, the source HeNB GW sends the UE context release command message to the S-HeNB. In step 913, the S-HeNB sends the UE context release completion message to the source HeNB GW. In Step 914, the S-HeNB GW sends the UE context release completion message to the MME.

Figure 10:
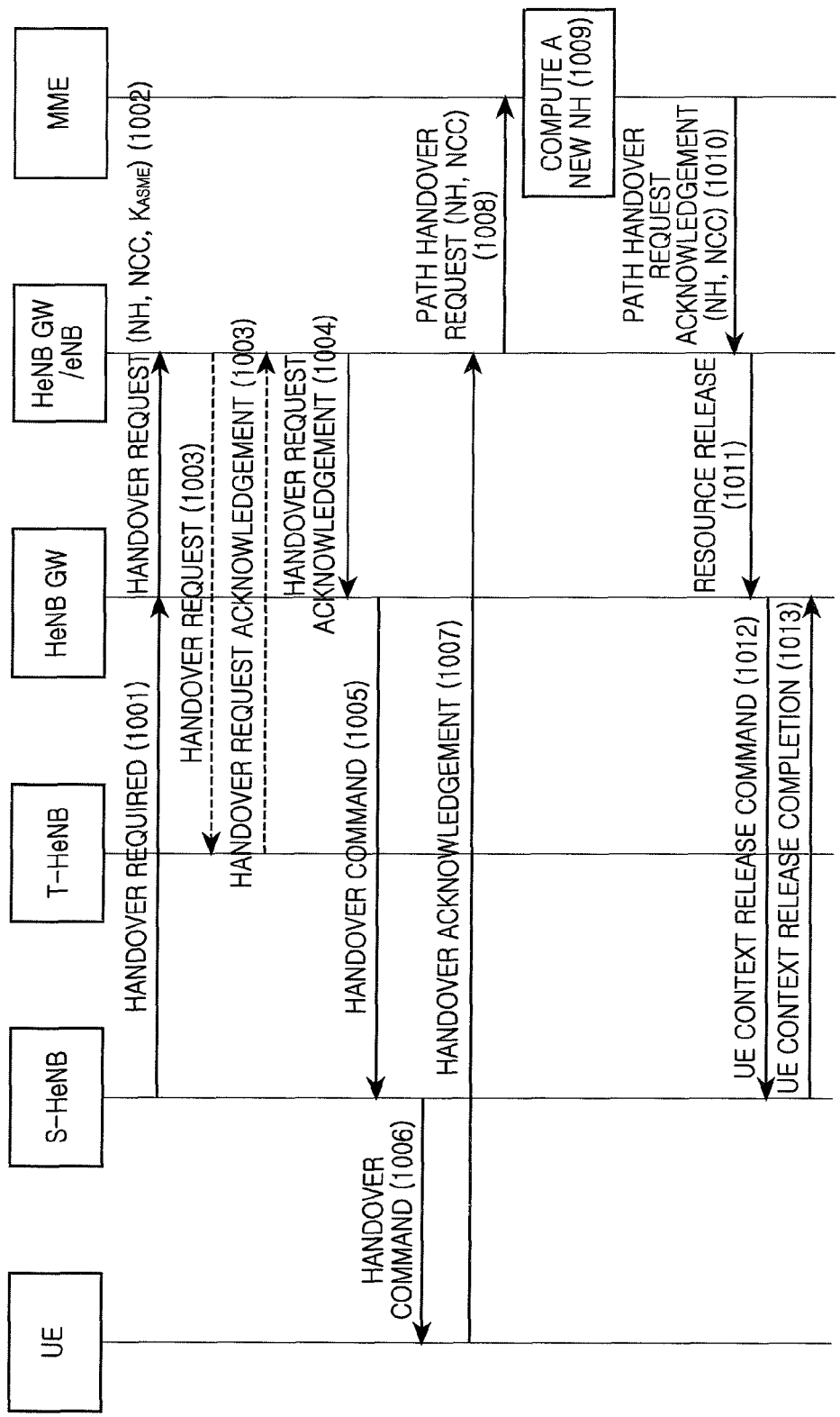
FIG. 10 is a flowchart illustrating a method for ensuring the working of a key chain when the UE moves from the HeNB GW to another HeNB GW or an eNB in accordance with a second exemplary embodiment of the present invention.

FIG. 10 is a flowchart illustrating a method for ensuring a working of a key chain when a UE moves from a HeNB GW to another HeNB GW or an eNB in accordance with an exemplary embodiment of the present invention.

Detailed descriptions of the embodiment are given hereafter. However, some optional processes and steps unrelated to the present invention are omitted for convenience of description. Similar to FIG. 9, since access control is not a focus of the present exemplary embodiment, detailed descriptions of the access control method are omitted.

Referring to FIG. 10, in step 1001, an S-HeNB sends a handover required message to the HeNB GW. Next, in step 1002, a source HeNB GW sends an X2AP handover request message to the target HeNB GW/eNB. The X2AP handover request message includes a NH and a NCC currently saved by the HeNB GW. The X2AP handover request message includes a $K_{ASME}$ and a $K_{eNB}*$. The target HeNB GW/eNB uses the $K_{eNB}*$ as a new encryption key between itself and a UE.

In step 1003, if the UE moves to the HeNB of another HeNB GW, the HeNB GW adds the received NCC value, and the target HeNB GW computes a new NH according to the $K_{ASME}$ and the newly-received NH. The target HeNB GW sends the S1AP handover request message to the T-HeNB. The S1AP handover request message includes the new NH and NCC obtained by the computation. The T-HeNB allocates resources and sends a handover request acknowledgement message to the target HeNB GW.

In step 1004, the target HeNB GW/eNB sends an X2AP handover request acknowledgement message to the S-HeNB GW. In step 1005, the source HeNB GW sends a handover command message to the S-HeNB. In step 1006, the S-HeNB sends the handover command message to the UE. In step 1007, the UE sends a handover acknowledgement message to the target HeNB GW/eNB. If the UE switches to the HeNB of another HeNB GW, the UE sends the handover acknowledgement message to the target HeNB. The target HeNB sends the handover acknowledgement message to the target HeNB GW. Next, in step 1008, the target HeNB GW/eNB sends a path handover request message to the MME. The message includes the current NH and NCC. The HeNB GW allocates an operation for deriving the key to the MME.

In step 1009, the MME adds the received NCC value, and the MME computes a new NH according to the $K_{ASME}$ and the newly-received NH. Next, in step 1010, the MME sends a path handover request acknowledgement message to the target HeNB GW/eNB. The path handover request acknowledgement message includes the new NH and NCC. In step 1011, the target HeNB GW/eNB sends an X2AP resource release message to the source HeNB GW. Next, in step 1012, the source HeNB GW sends a UE context release command message to the source HeNB. In step 1013, the S-HeNB sends the UE context release completion message to the source HeNB GW.

Figure 11:
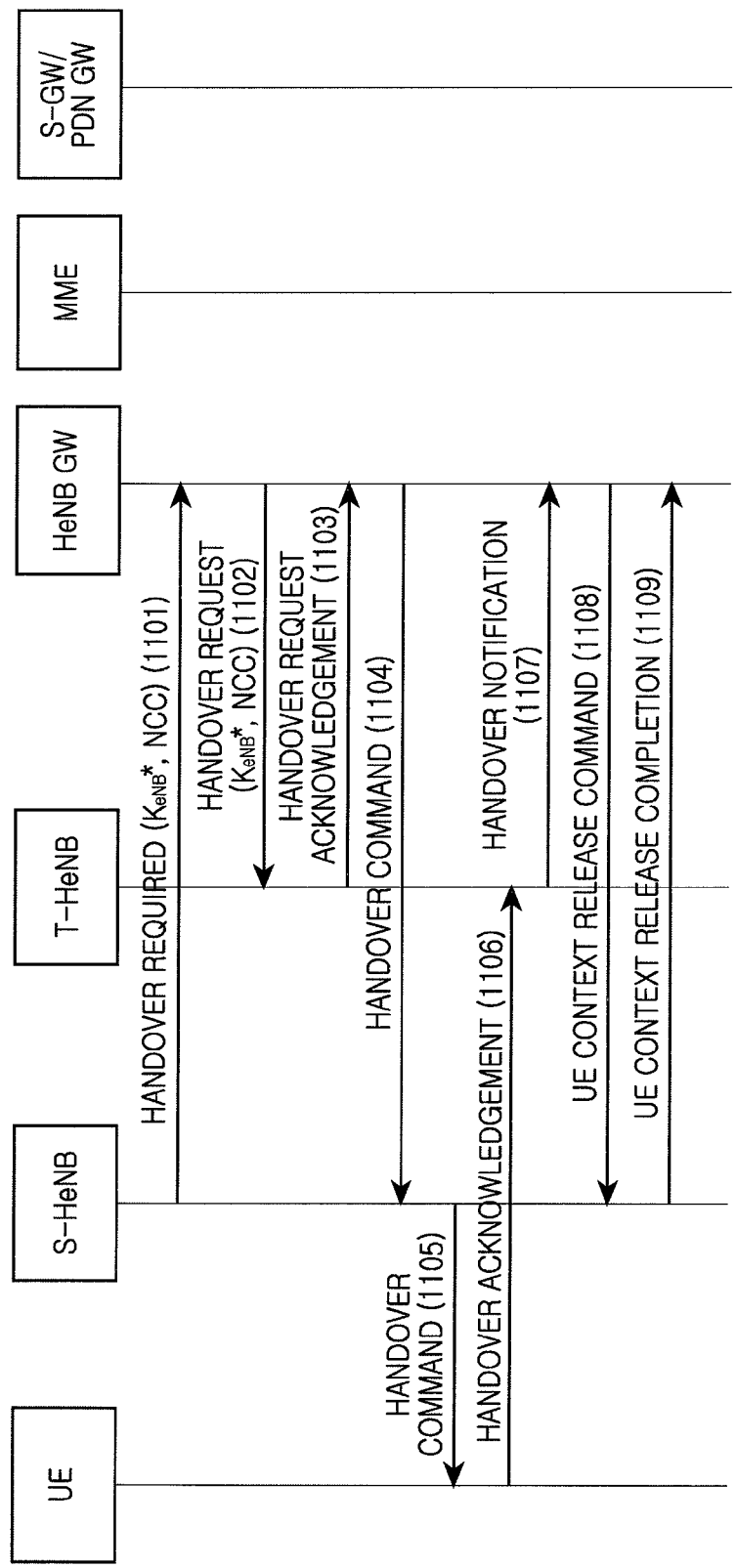
FIG. 11 is a flowchart illustrating a second method for solving the security problem when the handover process ends at the gateway in accordance with a first exemplary embodiment of the present invention.
Figure 12:
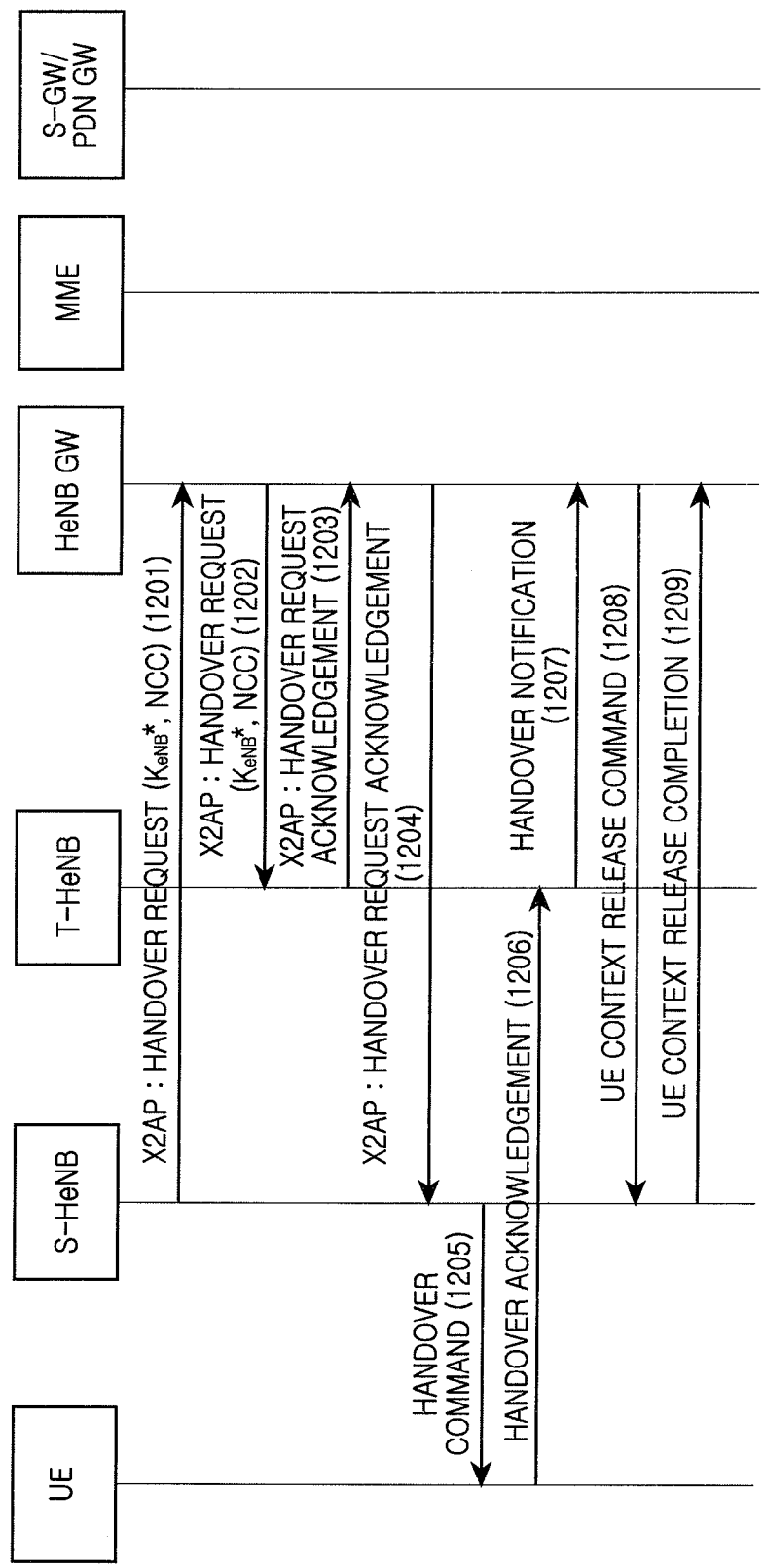
FIG. 12 is a flowchart illustrating a second method for solving the security problem when the handover process ends at the gateway in accordance with a second exemplary embodiment of the present invention.

A second exemplary method of an exemplary embodiment of the present invention is illustrated in FIGS. 11 and 12.

FIG. 11 is a flowchart illustrating a second method for solving a security problem when a handover process terminated at a gateway in accordance with an exemplary embodiment of the present invention.

Detailed descriptions of the exemplary embodiment are given hereafter. However, some optional processes and steps unrelated to the present invention are omitted for convenience of description.

Referring to FIG. 11, in step 1101, an S-HeNB makes a handover decision, and the S-HeNB sends a handover required message to a HeNB GW. The handover required message includes a $K_{eNB}*$ and NCC. The S-HeNB computes a new $K_{eNB}*$ according to the current $K_{eNB}$ or a new NH, a physical cell ID of the target cell, and frequency, and other information elements used to compute the new $K_{eNB}*$. The information elements of $K_{eNB}*$ and NCC are optional. For instance, the source HeNB only include the information elements when a target HeNB and a source HeNB connect to a same HeNB GW.

The handover required message of step 1101 includes indication information, indicating whether the UE is a member of a target cell, or in other words, whether the UE is a subscribed member of the cell or not. When the indication information is present, in step 1102, the HeNB GW notifies the T-HeNB of the information indicating whether the UE is a member of the target cell. The target HeNB may provide different QoSs according to the information indicating whether the UE is the member of the target cell. The indication information is an optional information element. For instance, for an exemplary embodiment having the handover process terminated at the HeNB GW only applies to a scenario wherein the UE moves in the same HeNB GW and with the same CSG ID (i.e. a CSG with the same CSG ID, or the hybrid cells with the same CSG ID). In this scenario, the HeNB GW needs not have the access control function, and the HeNB GW only needs to send a membership indication received from the S-HeNB to the T-HeNB.

In step 1102, the HeNB GW sends a handover request message to the T-HeNB. The handover request message includes a $K_{eNB}*$ and NCC received from the S-HeNB. The HeNB GW sets the NH in the handover request message as an invalid value or any value. Next, in step 1103, the T-HeNB allocates resources, and the T-HeNB takes the KeNB* as a new encryption key KeNB between itself and the UE. The T-HeNB associates the received NCC and KeNB. The T-HeNB carries the received NCC in the handover command message sent to the UE. The T-HeNB omits a value of the NH received in the handover request message. Then, continuing with step 1103, the T-HeNB sends a handover request acknowledgement message to the HeNB GW.

In step 1104, the HeNB GW sends a handover command message to the S-HeNB. In step 1105, the S-HeNB sends the handover command message to the UE. In step 1106, the UE sends a handover acknowledgement message to the target HeNB. In step 1107, the T-HeNB sends a handover notification message to the HeNB GW. Next, in step 1108, the HeNB GW sends a UE context release command message to the source HeNB. In step 1109, the S-HeNB sends a UE context release completion message to the HeNB GW.

FIG. 12 is a second embodiment illustrating the second method for solving the security problem when the handover process ends at the gateway in accordance with an exemplary embodiment of the present invention.

Detailed descriptions of the present exemplary embodiment are given hereafter. However, some optional processes and steps unrelated to the present invention are omitted for convenience of description.

Referring to FIG. 12, in step 1201, an S-HeNB makes a handover decision and the S-HeNB sends an X2AP handover request message to a HeNB GW. The X2AP handover request message includes a $K_{eNB}*$ and NCC. The S-HeNB computes a new $K_{eNB}*$ according to a current $K_{eNB}$ or a new NH, a physical cell ID of the target cell, and frequency, or other information. In step 1202, the HeNB GW sends the X2AP handover request message to a T-HeNB. The X2AP handover request message includes the $K_{eNB}*$ and NCC received from the S-HeNB.

In step 1203, the T-HeNB allocates resources and sends an X2AP handover request acknowledgement message to the HeNB GW. Next, in step 1204, the HeNB GW sends the X2AP handover request acknowledgement message to the S-HeNB. In step 1205, the S-HeNB sends a handover command message to the UE. In step 1206, the UE sends a handover acknowledgement message to the T-HeNB. In step 1207, the T-HeNB sends an S1AP handover notification message to the HeNB GW. Next, in step 1208, the HeNB GW sends an S1AP UE context release command message to the source HeNB. In step 1209, the S-HeNB sends an S1AP UE context release completion message to the HeNB GW.

The functions of steps 1207 to 1209 also can be implemented with the following steps. The T-HeNB receives the handover acknowledgement message sent from the UE, and the T-HeNB sends a path switch request message to the HeNB GW. Then, the HeNB GW sends the path switch request acknowledgement message to the target HeNB. The path switch request acknowledgement message includes invalid security contexts, such as an invalid NH and NCC pair, or invalid security information indication information. The T-HeNB does not save the received invalid NH and NCC pair according to the invalid security context information, such as the invalid NH and NCC pair, or invalid security context indication information.

In the next X2 handover process, the $K_{eNB}*$ is generated with a horizontal key generation mechanism, or in other words, the $K_{eNB}*$ is computed with a PCI of a target cell, an EARFCN-DL of the target cell and the current active $K_{eNB}$. Alternatively, in the next X2 handover process, the $K_{eNB}*$ is generated with a vertical key generation mechanism, or in other words, the $K_{eNB}*$ is computed with the PCI of the target cell, the EARFCN-DL of the target cell and the existing NH. The T-HeNB sends an X2AP resource release message to the HeNB GW. The HeNB GW sends the X2AP resource release message to the S-HeNB.

Figure 13:
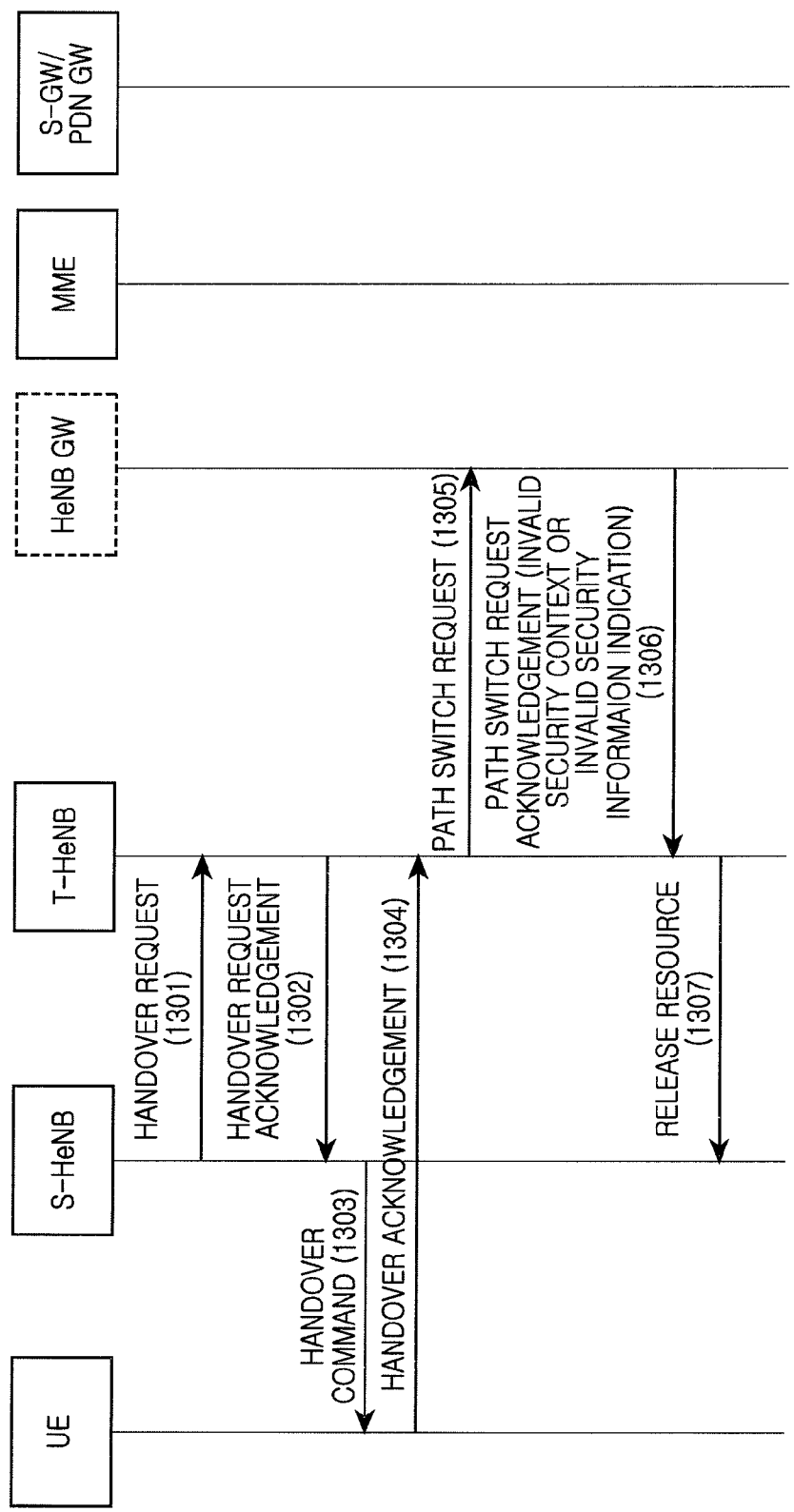
FIG. 13 is a flowchart illustrating a third method for solving the security problem when the handover process ends at the gateway in accordance with an exemplary embodiment of the present invention.

FIG. 13 is a flowchart illustrating a third exemplary method for addressing a security problem when a handover process is terminated at a gateway in accordance with an exemplary embodiment of the present invention.

Detailed descriptions of the exemplary embodiment are given hereafter. However, some optional processes and steps unrelated to the present exemplary embodiment are omitted for convenience of description. As described in FIG. 12, access control may be performed by an S-HeNB, HeNB GW or T-HeNB. Alternatively, if a source cell and a target cell are located at a same CSG, the access control may be omitted. Additionally, since the access control is not the focus of the present exemplary embodiment, detailed descriptions of the access control method are omitted.

Referring to FIG. 13, in step 1301, an S-HeNB sends a handover request message to a T-HeNB. Although not required in all embodiments of the present invention, the handover request message includes a CSG ID of a target cell, an ID list of CSGs to which the UE can access, and the $K_{eNB}*$ and NCC pair. A method for computing the $K_{eNB}*$ and NCC is similar to that of a conventional method, and thus, a description thereof will be omitted for convenience of description.

In step 1302, the T-HeNB directly takes the $K_{eNB}*$ as a new encryption key $K_{eNB}$ for use between itself and the UE. The T-HeNB associates the $K_{eNB}$ and the received NCC. The T-HeNB carries the NCC value received from the S-HeNB in a handover command message in a transparent container from the T-HeNB to the S-HeNB, and the S-HeNB sends the NCC value to the UE. The T-HeNB sends a handover request acknowledgement message to the S-HeNB.

In step 1303, the S-HeNB sends a handover command message to the UE. Next, in step 1304, the UE sends a handover acknowledgement message to the T-HeNB. In step 1305, the T-HeNB sends a path switch request message to the HeNB GW. In step 1306, the HeNB GW sends a path switch request acknowledgement message to the T-HeNB. The path switch request acknowledgement message includes an invalid security context, such as an invalid NH and NCC pair or invalid security information indication information. Thus, the T-HeNB does not save the received invalid NH and NCC according to the invalid security context information.

In a subsequent X2 handover process, the $K_{eNB}*$ is generated with a horizontal key generation mechanism, or in other words, the $K_{eNB}*$ is computed according to a PCI of the target cell, an EARFCN-DL of the target cell, and the current active KeNB. Alternatively, in the subsequent X2 handover process, the $K_{eNB}*$ is generated with a vertical key generation mechanism, or in other words, the $K_{eNB}*$ is computed with the PCI of the target cell, the EARFCN-DL of the target cell and an existing NH. Next, in step 1307, the T-HeNB sends a resource release message to the S-HeNB.

FIG. 14 is a flowchart illustrating a method that a BS notifies a core network of a type of itself in accordance with an embodiment of the present invention.

Referring to FIG. 14, in step 1401, the HeNB, HeNB GW, or eNB sends an S1 establishment request message to the MME, and the S1 establishment request message includes a BS type indication, which is an information element for indicating that the downlink node is the HeNB GW. The information element is further used for indicating whether the downlink node is the HeNB or eNB. Next in step 1402, the MME sends an S1 establishment response message to the HeNB, HeNB GW, or eNB.

As described above and shown in corresponding figures, exemplary embodiments of the present invention provide a method for ensuring a working of a security key chain when a handover process is terminated at a HeNB GW. Thus, when the handover process is terminated at the HeNB GW, the key information will not be lost, which reduces the impact of the handover process on the core network, and improves the efficiency of the UE handover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for obtaining a secure key, the method comprising:
    receiving, by a gateway with a hardware processor, an Access Safety Management Entity Key ($K_{ASME}$) from a Mobility Management Entity (MME) after finishing an authentication and security process by the MME in a core network;
    computing, by the gateway, a Next Hop (NH) using the $K_{ASME}$;
    receiving, by the gateway, a handover message, which is a handover required message or a path switch request message, from a Base Station (BS);
    obtaining, by the gateway, a new NH through the computing of the NH; and
    sending, by the gateway, the new NH and a NH Change Counter (NCC) corresponding to the new NH to the BS.

2. The method of claim 1, further comprising:
    if the gateway receives an updated $K_{ASME}$ and an updated Evolved NodeB Key ($K_{eNB}$) from the MME, then saving, by the gateway, the updated $K_{ASME}$ and the updated $K_{eNB}$, and sending the updated $K_{eNB}$ to a Home Evolved NodeB ($H_{eNB}$).

3. The method of claim 2, wherein the gateway receives the $K_{ASME}$ and $K_{eNB}$ from the MME through an initial context establishment request message or a User Equipment (UE) context modification request message.

4. The method of claim 1, wherein, if a User Equipment (UE) handover occurs between a source BS and a target BS, the method further comprises:
   sending, by the gateway, a most current NH and a NH Change Counter (NCC) corresponding to the most current NH to the MME in the core network,
   wherein the MME computes a new NH according to the most current NH, and sends the new NH and the corresponding NCC to the target BS.

5. The method of claim 4, wherein the gateway sends the most current NH and NCC to the MME in the core network through a handover required message.

6. The method of claim 1, wherein, if a User Equipment (UE) moves from a source gateway to one of a target gateway and a target BS, the method further comprises:
   sending, by the source gateway, the $K_{ASME}$, a most current NH and a NH Change Counter (NCC) to the target gateway or the target BS; and
   sending, by the target gateway or target BS, the most current NH and the NCC to the MME in the core network,
   wherein the MME computes a new NH according to the most current NH.

7. The method of claim 6, wherein the source gateway sends the $K_{ASME}$, the new NH and the NCC to the target gateway or target BS through a handover request message of an X2 interface.

8. The method according to claim 6, wherein the target network sends the new NH and the NCC to the MME in the core network through a path handover request message of an S1 interface.

9. A communication apparatus for obtaining a secure key, the apparatus comprising:
   a gateway with a hardware processor configured to receive an Access Safety Management Entity Key ($K_{ASME}$) from a Mobility Management Entity (MME) after completing an authentication and security process in a core network, to compute a Next Hop (NH) using the $K_{ASME}$ upon receiving the $K_{ASME}$ from the MME, to receive a handover message that is one of a handover required message and a path switch request message from a Base Station (BS), to obtain a new NH through the computing of the NH, and to send the new NH and a NH Change Counter (NCC) corresponding to the new NH to the BS.

10. The apparatus of claim 9, wherein the gateway is configured to receive an updated $K_{ASME}$ and an updated Evolved NodeB Key ($K_{eNB}$) from the MME, to save the updated $K_{ASME}$ and the updated $K_{eNB}$, and to send the updated $K_{eNB}$ to a Home Evolved NodeB ($H_{eNB}$).

11. The apparatus of claim 10, wherein the gateway is configured to receive the $K_{ASME}$ and the $K_{eNB}$ from the MME through one of an initial context establishment request message and a User Equipment (UE) context modification request message.

12. The apparatus of claim 9, wherein, if a User Equipment (UE) handover between a source Base Station (BS) and a target BS occurs, then the gateway is configured to send a current NH and a current NH Change Counter (NCC) to the MME in the core network,
   wherein the MME computes a new NH according to the current NH, and the MME sends the new NH and a corresponding NCC to the target BS.

13. The apparatus of claim 12, wherein the gateway sends the new NH and the corresponding NCC to the MME in the core network through a handover required message.

14. The apparatus of claim 9, wherein if a User Equipment (UE) moves from a source gateway to a target gateway or a target Base Station (BS), then the source gateway is configured to send the $K_{ASME}$, the current NH and a corresponding NH Change Counter (NCC) to the target gateway or the target BS, and the target gateway is configured to send the newest NH and NCC to the MME in the core network,
   wherein the MME in the core network computes a new NH according to the current NH.

15. The apparatus of claim 14, wherein the source gateway sends the $K_{ASME}$, the new NH and the corresponding NCC to the target gateway or the target BS through a handover request message of an X2 interface.

16. The apparatus of claim 14, wherein the target gateway is configured to send the new NH and the corresponding NCC to the MME in the core network through a path handover request message of an S1 interface.

17. A method for obtaining a secure key, the method comprising:
   receiving, by a gateway with a hardware processor, from a source Base Station (BS), a handover required message which includes an Evolved NodeB Key ($K_{eNB}$*) and a corresponding Next Hop (NH) Change Counter (NCC) of an NH computed by the source BS; and
   sending, by the gateway, a handover request message, the handover request message including the $K_{eNB}$* and the corresponding NCC, to a target BS, the target BS taking the $K_{eNB}$* as a new key used between the target BS and a User Equipment (UE).

18. A communication apparatus for obtaining a secure key, the apparatus comprising:
   a gateway with a hardware processor configured to receive, from a source Base Station (BS), a handover required message including an Evolved NodeB Key ($K_{eNB}$*) and a Next Hop (NH) Change Counter (NCC) corresponding to a Next Hop computed by the source BS, and to send a handover request message including the $K_{eNB}$* and the corresponding NCC to a target BS upon receiving the handover required message, the target BS taking the $K_{eNB}$* as a new key used between the target BS and a User Equipment (UE).

* * * * *